United States Patent Office 3,311,946
Patented Apr. 4, 1967

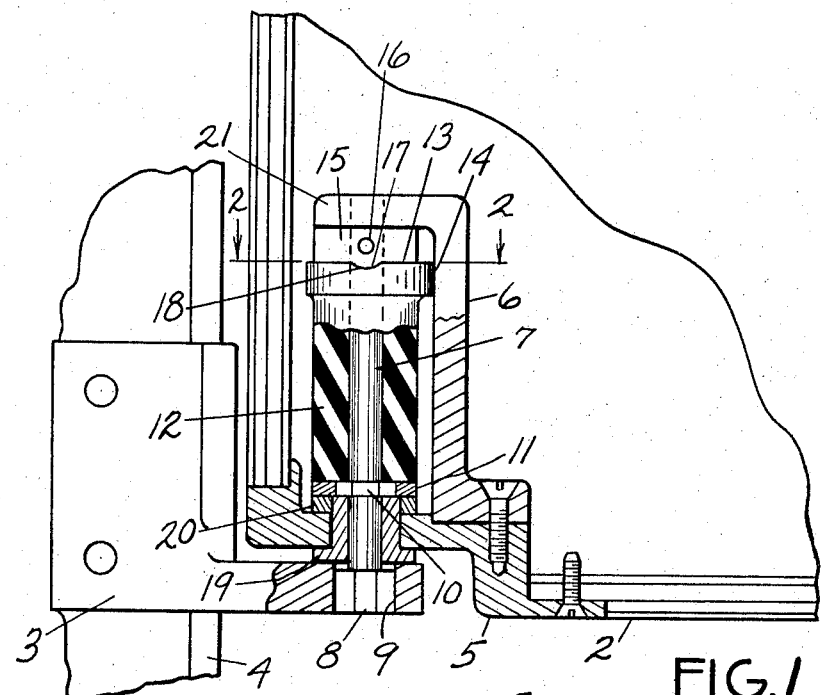
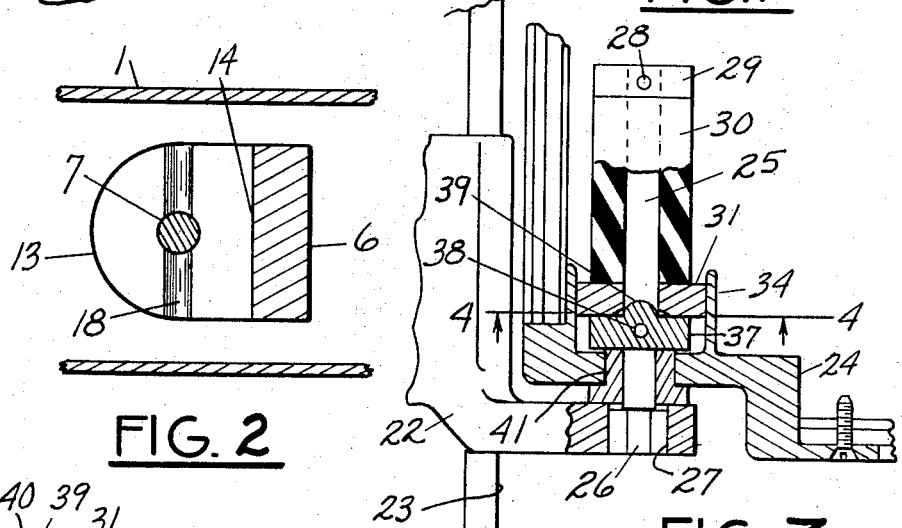
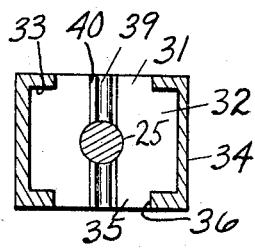

3,311,946
SPRING HINGE
John H. Crankshaw, Erie, Pa., assignor to General-Erie Corp., Erie, Pa., a corporation of Pennsylvania
Filed June 19, 1964, Ser. No. 376,444
5 Claims. (Cl. 16—180)

This invention is a spring hinge adapted to be installed within the lower edge of a door.

In the drawing, FIG. 1 is an elevation, partly broken away, of the hinge installed within the lower end of a door, FIG. 2 is a section on line 2—2 of FIG. 1, FIG. 3 is a sectional elevation of a modification, and FIG. 4 is a partial section on line 4—4 of FIG. 3.

The hinge is shown installed within the lower end of a metal door having spaced walls or panels 1 connected at the edges by strips 2. The lower end of the door is hinged by a bracket 3 connected to a door frame 4 and by a bracket 5 fixed in the lower corner of the door in substantial direct continuation of the edges. Fixed to the upper side of the bracket 5 is a bracket 6 which is concealed between the door panels 1. The brackets 5 and 6 are secured together before installation in the door.

The hinge has a pin 7 with a non-circular head 8 seated in a socket 9 in the bracket 3. The head 8 and socket 9 may be hexagonal so as to permit the hinge pin to be located in a number of different angular positions with respect to the bracket 3. The hinge pin 7 also has a non-circular section 10 non-rotatably seated in a ring 11 bonded to the lower end of a tubular body 12 of rubber or other suitable elastomer. The upper end of the tubular rubber body 12 is bonded to a washer 13 having a flat surface 14 which bears against the inner surface of the bracket 6.

On the upper surface of the washer 13 is a ring 15 fastened by pin 16 to the hinge pin 7 and having on its under side a rib 17 which fits in a groove 18 in the upper side of washer 13. The purpose of the rib 17 and 18 is to compel the door to return to the same position. As the door is swung from the position shown, the hinge pin 7 remains stationary because its lower end 8 is anchored in the bracket 3 fixed to the door frame. The rings 11 and 15 also remain stationary because they are non-rotatably fixed to the hinge pin respectively by the non-circular projection 10 and by the pin 16. The flat surface 14 on the washer 13 compels the washer 13 to turn with the door, thereby applying a torsional twist to the elastomer 12 and forcibly moving the washer 13 relative to the ring 15. The body 12 is compressed axially as the rib 17 moves out of the groove 18. When the door is released, the spring action of the body 12 returns the hinge to the position illustrated and upon coming into alignment, the rib 17 snaps into the groove 18 and positively locates the door.

At the lower end, the bracket 5 is guided on a split bushing 19 surrounding the pin and the weight of the door is taken by a thrust washer 20. The upper end of the hinge pin 7 is journaled in a flange 21 on the bracket 6. This maintains the hinge pin in positive alignment with the hinge brackets.

In a modification shown in FIGS. 3 and 4, the lower end of the door is hinged by a bracket 22 connected with the door frame 23 and by a bracket 24 fixed in the lower corner of the door in substantial direct continuation of the edges of the door. The hinge has a pin 25 with a non-circular head 26 seated in a socket 27 in bracket 22. The head 26 and socket 27 may be hexagonal so as to permit the hinge pin to be located in a number of different angular positions with respect to the bracket 22. The upper end of the hinge pin is fixed by pin 28 to a washer 29 bonded to the upper end of a tubular body 30 of rubber or other suitable elastomer telescoped over the hinge pin. The lower end of the body 30 is bonded to a washer 31 having ears 32 slidably received in channel shaped guides 33 in projections 34 integral with the upper side of the bracket 24. Diametrically opposed ears 35 are slidably received in slots 36 between the projections 34. By this construction, the washer 31 is free to slide vertically but cannot rotate relative to the bracket 24. On the under side of the washer 31 is a circular washer 37 pinned to the hinge pin by a pin 38. On the upper side of the washer 37 is a rib 39 which fits in a groove 40 on the under side of the washer 31. The purpose of the rib 39 and groove 40 is to compel the door to return to the same position.

As the door is swung from the position shown, the hinge pin 25 remains stationary because its lower end 26 is anchored in the bracket 22 fixed to the door frame. The washers 29 and 37 also remain stationary because they are non-rotatably fixed to the hinge pin. The interfitting projections 32 and channel shaped guides 33 compel the washer 31 to turn with the door, thereby applying a torsional twist to the elastomer 30 and forcibly moving the washer 31 relative to the washer 37. This relative movement cams the rib 39 out of the groove 40 and compresses the elastomer 30 axially. When the door is released, the spring action of the elastomer 30 returns the hinge to the position illustrated and upon coming into alignment, the rib 39 snaps into the groove 40 and positively locates the door.

At the lower end, the bracket 24 is guided on a bushing 41 which maintains the hinge pin in positive alignment with the hinge brackets.

In both hinges, the elastomer is preferably under slight axial compression in the FIGS. 1 and 3 positions.

What is claimed as new is:

1. In a spring hinge, a hinge bracket having upper and lower flanges, a hinge pin having its upper end journaled in the upper flange and having upper and lower non-circular sections respectively above and below the lower flange, a bearing for the hinge pin in the lower flange between said non-circular sections, a tubular body of elastomer, said elastomer having its lower end bonded to a bottom ring having a non-circular opening receiving the non-circular section of the hinge pin above the lower flange, said elastomer having its upper end bonded to a washer non-rotatably engaging the hinge bracket, a top ring between the upper flange and the washer and fixed to the pin, interengaging cam faced projections and depressions in the top ring and washer releasably holding the top ring in fixed relation to the washer, and another hinge bracket having a socket non-rotatably holding the lower non-circular section of the hinge pin.

2. In a spring hinge, a hinge bracket having upper and lower flanges, a hinge pin having its upper end journaled in the upper flange, a bearing in the lower flange for the hinge pin, a tubular body of elastomer, said elastomer having its lower end bonded to a bottom ring, means for non-rotatably fastening the bottom ring to the hinge pin, said elastomer having its upper end bonded to a washer non-rotatably engaging the hinge bracket, a top ring fixed to the pin between the upper flange and the washer, interfitting cam faced projections and depressions in the top ring and washer releasably holding the top ring in fixed relation to the washer, and another hinge bracket non-rotatably holding the lower end of the hinge pin.

3. In a spring hinge, a hinge bracket having upper and lower flanges, a hinge pin having its upper end journaled in the upper flange and having upper and lower non-circular sections respectively above and below the lower flange, a bearing for the hinge pin in the lower flange between said non-circular sections, a tubular body of elastomer, said elastomer having its lower end bonded to a bottom ring having a non-circular opening receiving the non-circular section of the hinge pin above the lower flange, said elastomer having its upper end bonded to a washer non-rotatably engaging the hinge bracket, and another hinge bracket having a socket non-rotatably holding the lower non-circular section of the hinge pin.

4. In a spring hinge, a hinge bracket, a hinge pin, a bearing in the bracket for the lower end of the hinge pin, a tubular body of elastomer, said elastomer having its upper and lower ends bonded respectively to upper and lower washers, means fixing one of the washers to the pin, means guiding the other washer in the bracket for sliding movement along the hinge pin while preventing rotation relative to the bracket, a third washer fixed to the pin and presented toward said other washer, interengaging cam faced projections and depressions in the third washer and said other washer releasably holding the third washer in fixed angular relation to said other washer, and another hinge bracket having means for non-rotatably holding the lower end of the hinge pin.

5. In a spring hinge, a hinge bracket, a hinge pin, a bearing in the bracket for the lower end of the pin, a tubular body of elastomer telescoped over the pin, said elastomer having its upper and lower ends bonded respectively to first and second washers, means non-rotatably connecting one of the washers to the hinge pin, the other washer and the hinge bracket having non-circular interengaging surfaces extending along the pin and in sliding engagement with each other for preventing rotation of the washer relative to the hinge bracket, said other washer being mounted on the hinge pin for sliding movement, cam means secured to the hinge pin for sliding the other washer along the hinge pin upon rotation of the hinge bracket relative to the hinge pin, and another hinge bracket having means for non-rotatably holding the lower end of the hinge pin.

References Cited by the Examiner
UNITED STATES PATENTS

| | | | |
|---|---|---|---|
| 2,924,843 | 2/1960 | Tykeson | 16—182 |
| 2,981,970 | 5/1961 | Nayes et al. | 16—182 |

EDWARD C. ALLEN, *Primary Examiner.*

D. L. TROUTMAN, *Assistant Examiner.*